United States Patent [19]

Staats

[11] 4,137,289

[45] Jan. 30, 1979

[54] METHOD OF MAKING A SPIRAL BINDER

[75] Inventor: Henry N. Staats, Deerfield, Ill.

[73] Assignee: General Binding Corporation, North Brook, Ill.

[21] Appl. No.: 895,394

[22] Filed: Apr. 11, 1978

Related U.S. Application Data

[62] Division of Ser. No. 808,556, Jun. 21, 1977.

[51] Int. Cl.$^2$ ............ B29C 17/02; B29C 17/10
[52] U.S. Cl. ........................ 264/138; 264/320; 264/339
[58] Field of Search ............ 264/138, 285, 339, 320; 402/8, 19, 75

[56] References Cited

U.S. PATENT DOCUMENTS

| | | | |
|---|---|---|---|
| 2,354,094 | 7/1944 | Thomas | 264/339 |
| 2,491,527 | 12/1949 | Spinner | 264/339 |
| 2,491,528 | 12/1949 | Spinner | 264/339 |
| 2,676,360 | 4/1954 | Emmer | 264/339 |
| 2,686,932 | 8/1954 | Zaleski | 425/384 |

*Primary Examiner*—W. E. Hoag
*Attorney, Agent, or Firm*—Hill, Gross, Simpson, Van Santen, Steadman, Chiara & Simpson

[57] ABSTRACT

Method of making a removable spiral plastic binder which is designed to be received into a channel member. The channel member is mounted to the backbone of a book cover. The removable binding, which is slidably received in the channel member, has a plurality of curled loops for retaining paper leaflets such as sheets of blank checks to the book cover. The removable binding has retaining tabs extending from a base portion below the loops. The tabs are bent such that they all lie substantially in the same plane to facilitate sliding of the binding into the channel member. The removable binding including the retaining tabs, base portion and curled loops is formed from a single, contiguous sheet of plastic material.

3 Claims, 9 Drawing Figures

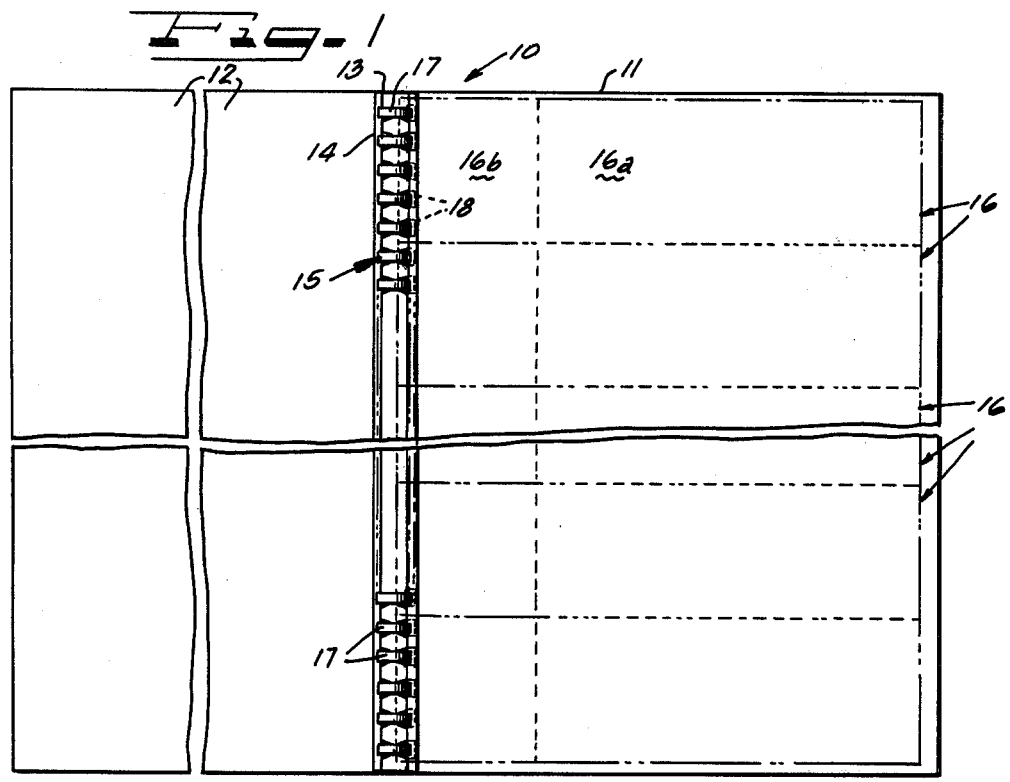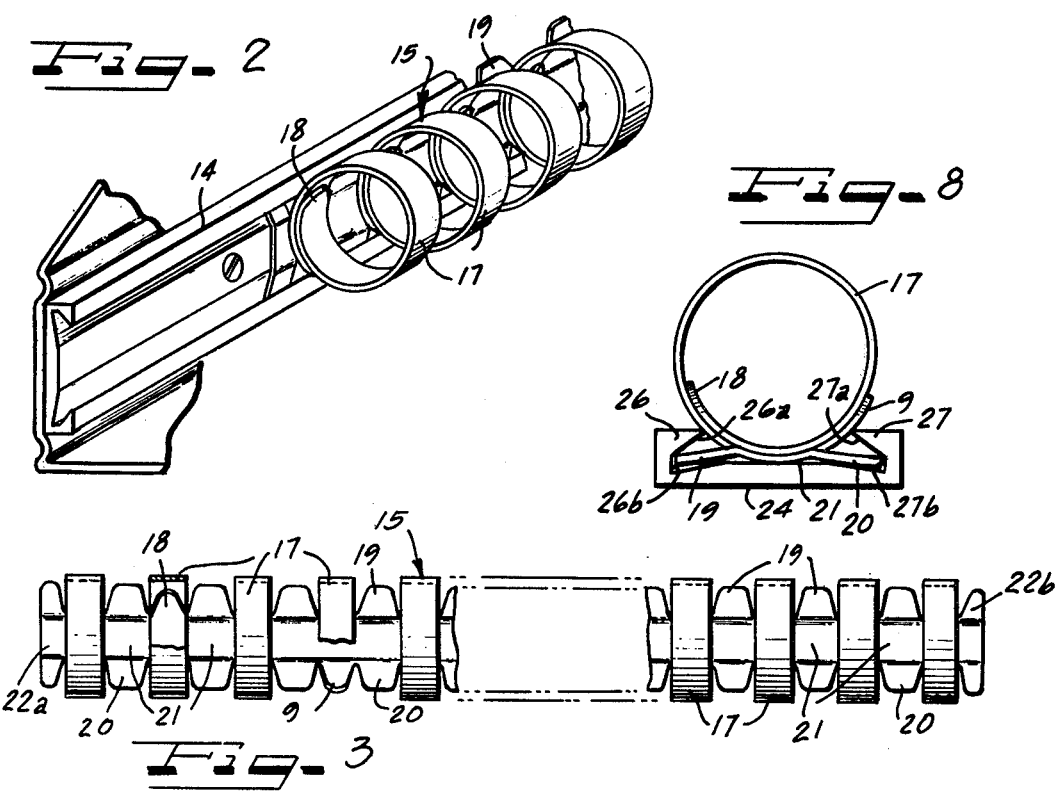

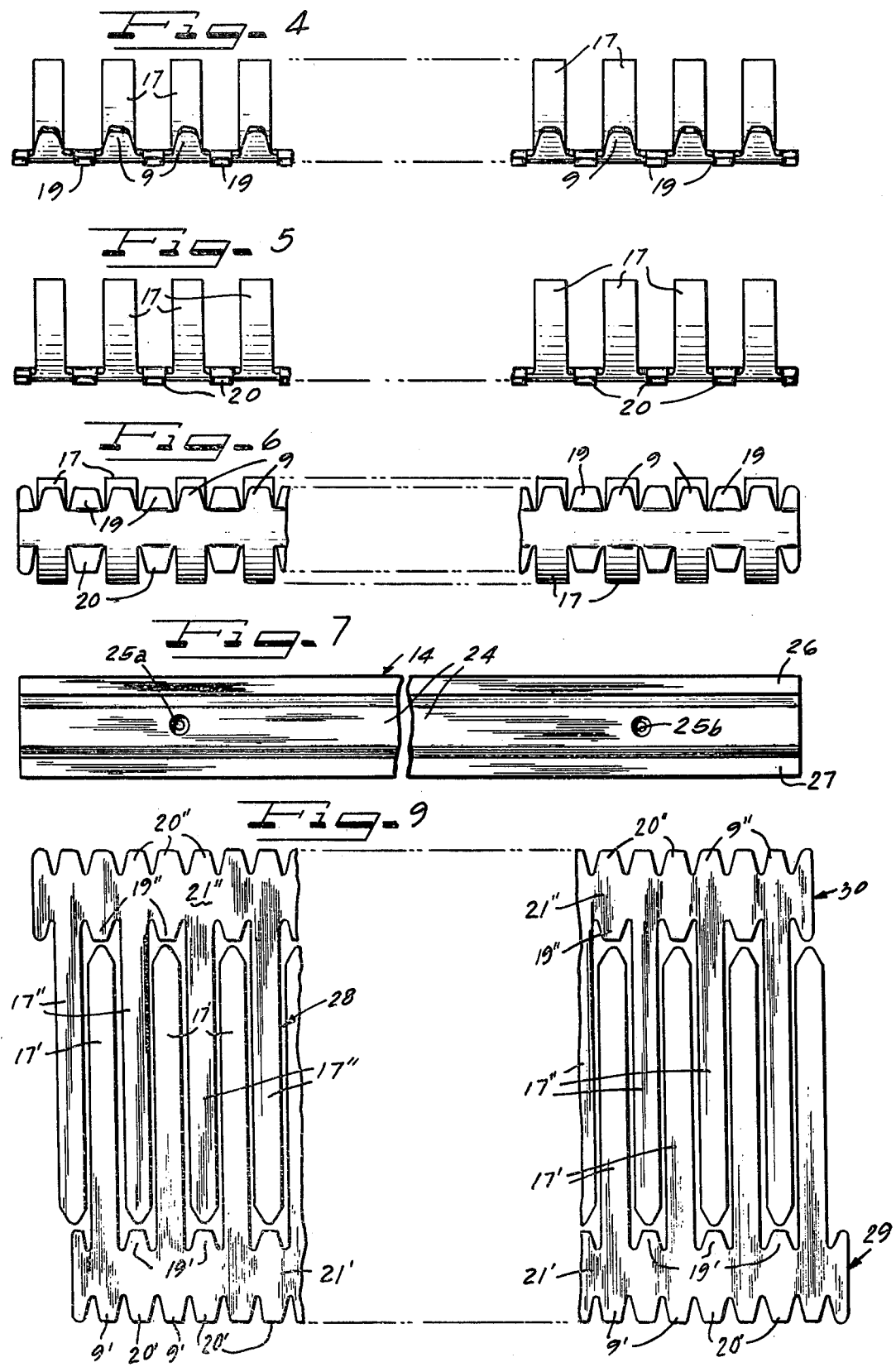

METHOD OF MAKING A SPIRAL BINDER

This is a division of application Ser. No. 808,556, filed June 21, 1977.

BACKGROUND OF THE INVENTION

1. Field of the Invention

This invention relates to a plastic binding system for retaining paper sheets to a book cover and more particularly to a binding system having curled finger-like plastic strips.

2. Description of the Prior Art

Conventional plastic bindings are known in which a curved base portion has finger-like curled strips extending from one longitudinal side edge. Such plastic bindings are attached to a backbone of a book cover and paper sheets having retaining apertures are placed onto the book cover and the loops of the binding are channeled through the retaining apertures of the paper sheets.

It is also known to provide such a binding in which a narrow plastic strip is cemented along the base portion of the binding such that edge portions of the strip are slidable within a channel member mounted on a backbone of the book. This system permits mounting of the paper sheets to the binding such that the bound sheets may be insertable at a later time into a book cover. Such a system is most useful with sheets of blank checks wherein the checks are initially bound by the binding and stored in a container. They are eventually removed from the container and inserted into a sheet metal channel which in turn is fastened to the inside portion of the book cover. When the checks have all been used, the stubs may be removed still bound by the binding and stored elsewhere and a new set of checks inserted into the channel. The lie-flat characteristics of checks and stubs bound in this manner provide greater ease in handling and use. Furthermore, thicker checkbooks are feasible and desirable in commercial use.

A disadvantage of the known system is the requirement that two separate pieces of plastic be utilized, one for the binding and another for the mounting strips cemented to the binding. Both materials and production of such a binding system are consequently more costly.

SUMMARY OF THE INVENTION

It is an object of the present invention to provide a removable binding for retaining sheets to a book cover wherein the binding consists of a single piece of plastic.

It is another object of this invention to provide a removable binding for retaining paper sheets to a book cover in which a pattern for the binding is cut from a single piece of material in contiguous fashion.

It is another object of this invention to provide a removable binding which may be constructed with minimal changes in existing tooling used to construct conventional curled loop bindings.

According to the invention, the removable plastic binding system for attachment to the backbone of a book includes a strip-like channel member mounted on the backbone of the book cover. The channel member has an overhanging lip along each longitudinal side edge thereof. A removable plastic binding which is slidable into the channel from one end thereof has a curved base portion and curled retaining loops cradled on the base portion. A plurality of down-turned retaining tabs extend from the base portion along longitudinal side edges thereof and are engageable in the channel. To facilitate engagement, the retaining tabs are bent into substantially the same plane. The binding member including the loops and retaining tabs is formed of a single contiguous piece of plastic material as with conventional curled loop plastic bindings. Additional tabs along one side edge of the binding may also be provided in curved fashion such that they support the curled loops.

To construct a removable binding for the binding system of this invention, a sheet of plastic material is provided from which a pattern is cut for the removable binding. The pattern is formed of a strip-like base portion with parallel finger-like strips extending at right angles to the longitudinal axis of the base portion. The retaining tabs are formed as a first set of projecting tabs between each of the finger-like strips together with a second set of projecting tabs opposite each of the tabs of the first set along the opposite side edge of the base portion. A third set of projecting tabs may be provided between adjacent tabs of the second set. The above described pattern is then curled to curve the base portion and to form the finger-like strips into loops which are cradled by the curved base portion. The first and second sets of tabs are then bent away from the direction of curve of the base portion such that they lie substantially in the same plane to facilitate engagement in the mounting channel on the book cover.

BRIEF DESCRIPTION OF THE DRAWINGS

FIG. 1 is a plan view of an open book cover with a removable binding system of this invention mounted therein;

FIG. 2 is a perspective view of a channel member and binder receivable therein of this invention;

FIG. 3 is a plan view of the removable binder of this invention;

FIG. 4 is a side view of the binder of FIG. 3;

FIG. 5 is a side view from the opposite side of that shown in FIG. 4;

FIG. 6 is a bottom view of the binder of FIG. 1;

FIG. 7 is a plan view of the channel member utilized in the binding system of this invention;

FIG. 8 is an end view of the channel member of FIG. 7 with the binder of FIG. 3 slidably received therein; and FIG. 9 is a plan view of a pattern cut in a sheet of material for forming two of the binders of this invention.

DESCRIPTION OF THE PREFERRED EMBODIMENTS

The removable plastic binding system of this invention mounted to an open book cover as shown generally at 10 in FIG. 1. The book cover has cover leaves 11 and 12 with a book spine or backbone 13 therebetween. A binding retaining channel 14 is secured between the leaves on a surface of the backbone of the book cover. A removable plastic binding 15 is shown slidably received within the channel 14. Blank checks 16 having tear away check portions 16a and stubs 16b are attached to the binding 15 via loops 17 aligned through apertures 18 in the stubs 16b of the blank checks 16.

With the system shown in FIG. 1, a set of bound checks may be slidably mounted to the book cover for use. After all the checks 16a have been removed, the stubs 16b connected to the removable binding 15 may be removed from the book cover and stored, thus permitting the insertion of a new set of blank checks. Although this system is shown for use with blank checks, it will be obvious to those skilled in the art that other uses of the system are apparent whenever it is desirable to separately store a set of bound paper sheets.

FIG. 2 illustrates the slidable engagement of the binding 15 within the channel 14. A can be seen from FIGS. 2 through 8, the binding 15 has circular rings or loops 17 formed by curling long plastic finger-like strips having tongue-shaped ends 18 positioned on the inside of the curled loops. Between the loops on both sides of a circular base portion 21 of the binding 15 are positioned a set of protruding retaining tabs 18 and 20 which are downturned away from the direction of curvature of the base portion 21 as shown most clearly in FIG. 8. The tabs 19 and 20 are extensions of the base portion 21 and are bent downwardly such that they lie approximately in a common plane to facilitate slidable engagement into an end of the channel member 14. Loop supporting tabs 9 extending in the same direction of the curvature for the base portion 21 support each of the loops 17 in cradle-like fashion in combination with the circular base portion 21. At each end of the binding 15 end locking tabs 22a and 22b are respectively provided.

As shown most clearly in FIG. 7, channel member 14 functioning as a holder has a flat strip-like base portion 24 with mounting apertures 25a and 25b therein. Screws or other fastening members may be aligned through these apertures to mount the channel to the book cover.

The channel member 14 may be constructed of sheet metal, aluminum or extruded thermoplastic such as PVC, ABS or members of the polyolefin family.

Lip portions 26 and 27 are formed along longitudinal side edges of the base portion 24 of the channel member 14. The lip portions 26 and 27 respectively have overhanging edge walls 26a or 27a and substantially vertical side walls 26b or 27b. The lip portions 27 cooperate with the retaining tabs 19 and 20 on the binding 15 to permit slidable engagement from an end of the channel member 14.

The method of constructing the removable binding 15 of this invention will now be described with particular reference to FIG. 9. Initially, a flat blank 28 of plastic sheet material for the binding assembly has first 29 and second 30 patterns cut out of the blank which are intertwined with one another (pattern 29 corresponds with the binding of FIG. 2). The first pattern 29 has long plastic finger-like strips 17' extending at right angles to a base portion 21'. Similarly, second pattern 30 has finger-like strips 17" interleaved with the strips 17' of pattern 29. The finger-like strips are later formed as the loops 17. Retaining tabs 19' and 20' are provided in the pattern 29 such that each of the tabs 19' are formed between a pair of adjacent finger-like strips 17' and the tabs 20' are formed across from the tabs 19' along an opposite side edge of the base portion 21'. In similar fashion, retaining tabs 19" and 20" are formed in pattern 30. Finally, the loop supporting tabs 9' are formed across from each of the finger-like strips 17' along an opposite side edge of the base portion 21'. Supporting tabs 9" are similarly formed in pattern 30. After the patterns 29 and 30 have been cut free from the blank 28, they are curled to provide circular loops 17 and curved base portions 21. Curling of the patterns 29 or 30 may be accomplished by use of the system disclosed in U.S. Pat. No. 2,304,629 issued Dec. 8, 1942. There, a machine for forming plastic bindings is described in which patterns for such bindings are rolled into shape. Alternatively, an apparatus such as that described in U.S. Pat. No. 2,686,932 issued Aug. 24, 1954 may be used in which the patterns 29 or 30 are inserted into a heated block where they are curved into circular loops in an interior portion of the blocks forming a circular loop.

After formation of the loops 17 and curving of the base portion 21, the retaining tabs 19 and 20 are bent away from the direction of curvature of the base portion such that they all lie substantially in the same plane to facilitate alignment with the overhanging lips 26 and 27 and the channel member 14. Bending of the tabs may be accomplished by deforming the material until it yields such that blush marks appear. Such blush marks may then be eliminated by heating. Alternatively, the tabs 19 and 20 may be heated and then bent into planar alignment.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for constructing a removable binding slidably engageable in a channel member mounted to a cover, comprising:

providing a single sheet of plastic material;

cutting a pattern for the removable binding from the single sheet having a strip-like base portion, parallel finger-like strips extending at right angles to the longitudinal axis of the base portion, a projecting first tab between each of the finger-like strips, and a projecting second tab opposite each first tab projecting from an edge of the base portion;

curling the pattern to curve the base portion and form said finger-like strips into loops; and bending the first and second tabs away from the direction of curve of the base portion such that the first and second tabs all lie approximately in the same plane.

2. The method of claim 1 including the further step of cutting said pattern to provide a third tab between each set of adjacent second tabs.

3. The method of claim 1 including the further step of cutting two of said patterns from the sheet of plastic material such that the finger-like strips of each pattern are interlaced during the cutting.

* * * * *